C. S. DAHLQUIST.
AXLE.
APPLICATION FILED OCT. 2, 1920.

1,396,025.

Patented Nov. 8, 1921.

Inventor
Charles S. Dahlquist
by B. M. Kent
Attorney

UNITED STATES PATENT OFFICE.

CHARLES S. DAHLQUIST, OF CLEVELAND, OHIO, ASSIGNOR TO THE STANDARD PARTS COMPANY, OF CLEVELAND, OHIO, A CORPORATION OF OHIO.

AXLE.

1,396,025.  Specification of Letters Patent.  Patented Nov. 8, 1921.

Application filed October 2, 1920. Serial No. 414,306.

*To all whom it may concern:*

Be it known that I, CHARLES S. DAHLQUIST, a citizen of the United States, and a resident of Cleveland, county of Cuyahoga, State of Ohio, have invented certain new and useful Improvements in Axles, of which the following is a specification.

This invention relates to axles and more particularly to means for effectually lubricating the parts that are subjected to wear.

One of the objects of the invention is to provide in a driving axle means whereby copious quantities of lubricant may be deflected from one of the gears to the bearings and the driving means.

Other objects of the invention and the features of novelty will be apparent from the following description taken in connection with the accompanying drawings, wherein I have described and illustrated my invention, as applied to an axle of the worm gear drive type. In the drawings:—

Figure 1:
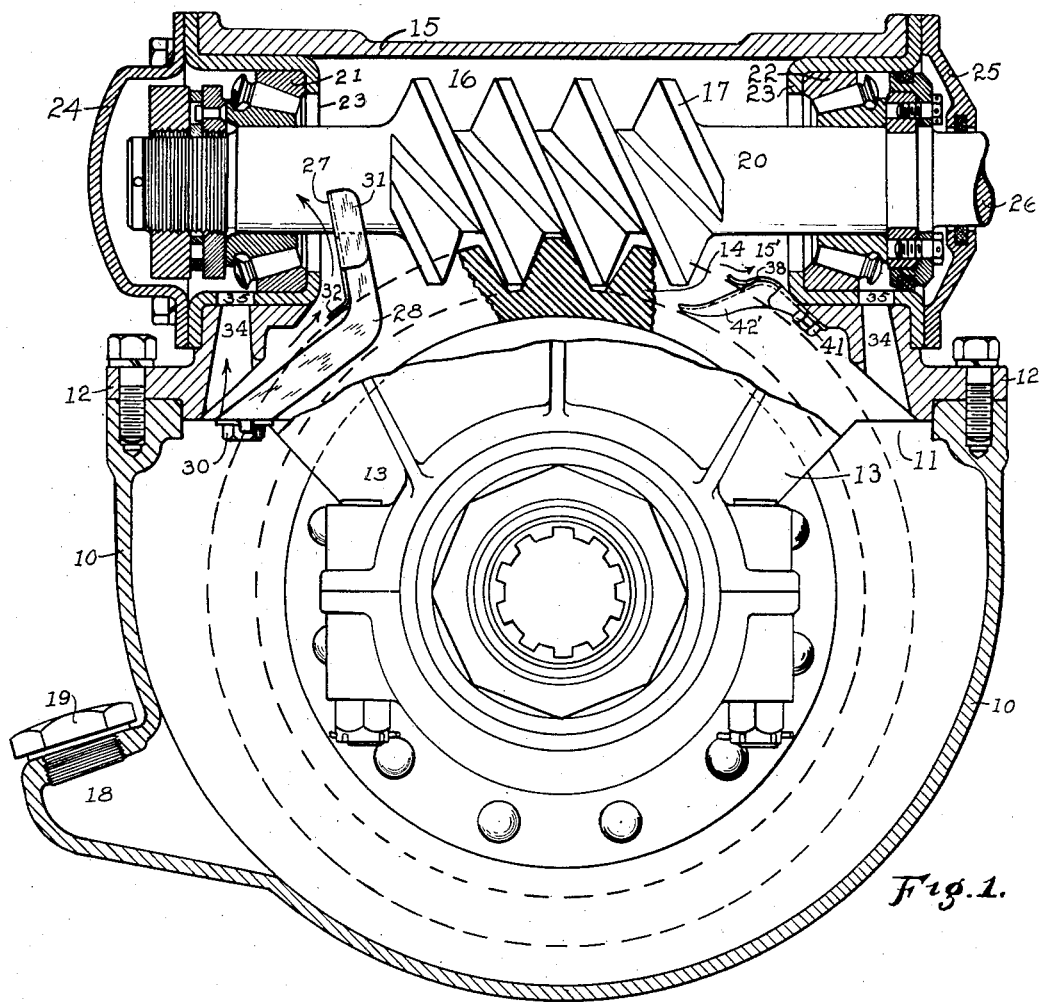
Figure 1 is a transverse section through an axle embodying the invention, the section being taken in the plane of the worm axis.
Figure 2:
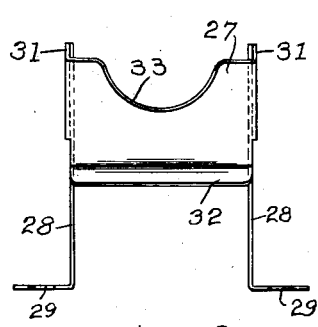
Fig. 2 is a plan view of one of the deflectors.
Figure 3:
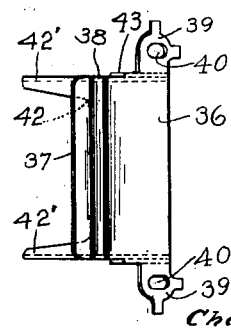
Fig. 3 is a similar view of the other deflector.

Referring to the drawings, 10 indicates the axle housing, which, in the form illustrated, has an opening 11 at its top side, this opening being closed by a cover plate 12 which carries brackets 13 on the interior of the housing. These brackets, respectively, support bearings for the differential gearing 14, which is adapted to drive shafts extending to the wheels, in the usual manner. The details of the differential mechanism may be of any preferred design, and the description of such details is omitted because they form no part of the present invention. The cover plate 12 has an upward extension or wall 15 forming a chamber 16 which conforms closely to the exterior of the worm 17, and the differential gearing 14 projects, through an opening 15' in wall 15, upwardly into mesh with the worm 17. The worm 17 may be integral with or secured on a suitable shaft 20, as preferred. The housing 10 is provided with an opening 18 which is usually closed by a plug 19, this opening being for the purpose of supplying lubricant to the interior of the housing. The plug 19 may be conveniently threaded for engaging in the threads of the opening 18. The shaft 20 is supported in suitable bearings 21 and 22 arranged on opposite sides of the worm 17 and suitably supported in cups 23 arranged in the ends of the chamber 16. The cups 23 have their outer ends closed by suitable caps 24 and 25. The shaft 20 has an extension 26 for connection with the propeller shaft of the vehicle.

In order to convey the lubricant to the bearing 21, I have provided a member consisting of a deflector or plate 27 and legs 28. The deflector may be held in position by suitable means, such as the bolts 30 threaded in the cover plate 12 and passing through the openings 29 of the legs 28. The deflector plate 27 is shown as provided with wings 31 extending at an angle to the plate 27 and suitably secured to the legs 28, by welding or otherwise, and is also provided with a flange 32 which extends in close proximity to the gear 14. The deflector 27 is cut away, as shown at 33, approximately in the form of a semi-circle, to enable it to fit closely to the shaft 20, and is arranged at a slight angle to a radius of the gear 14 and extends between the end of the worm 17 and the bearing 21 so as to deflect oil from the gear 14 to said bearing. The cover plate 12 has openings 34 registering with openings 35 in the cups 23, forming a return-channel whereby the oil from the bearings may be returned to the housing.

Adjacent the opposite end of the worm 17, a deflector plate 36 may be provided, if desired. As illustrated, this plate 36 is provided with a flange 37 extending into proximity with the gear 14 and serving to deflect oil from same. As shown, the flange 37 and the plate 36 may extend approximately parallel, the plate 36 having a curved portion 38 on which the flange 37 is formed. The plate 36 has the extensions or legs 39 provided with the openings 40 through which the bolts 41 threaded in the cover plate 12 may be inserted for holding the deflector in position. A strengthening member 42 may be provided having the stiffening legs 42' and suitably secured to the plate 36 or the wings 43 of said plate by spot welding or otherwise. However, it has been found in practice that it is frequently unnecessary to provide any deflector adjacent the forward bearing 22, as considerable oil is fed thereto by the action of the gears 14 and 17 without the aid of a deflecting means.

In the operation of the device, when the vehicle is being driven forward, the gear 14 rotates in a clockwise direction, as seen in Fig. 1, the lower portion of the housing 10 being filled with lubricant approximately to the height of the opening 18, and a considerable quantity of lubricant is carried upward by said gear and deflected by the flange 32 and the plate 27 to the bearing 21. It is found in operation that a steady stream of cool oil is thus supplied to the bearing. The same action takes place with reference to the flange 37 and the plate 36, which supply oil to the bearing 22. By this means, therefore, the bearing is not only supplied with sufficient lubricant but is, at the same time, kept cool. As motor vehicles are driven forward, for the greater part of the time, it is found unnecessary to provide deflecting means for operation during rearward drive, sufficient lubricant for these short periods being present in the bearing and a certain quantity will also be delivered to the bearing 22 through the adjacent openings 34 and 35 and to the bearing 21 along the shaft 20.

Having thus described my invention, what I claim is:

1. In mechanism of the class described, the combination of a housing, a gear therein, a shaft above said gear, a bearing for said shaft, and a plate extending into proximity with said gear for deflecting oil from said gear to the bearing.

2. In driving axles for motor vehicles, the combination of a housing, a gear therein, a shaft above the axis of the gear and having a member meshing with said gear, and a deflector extending into close proximity with said gear and adapted to deflect oil from said gear to said shaft.

3. In driving axles for motor vehicles, the combination of a housing, a gear therein, a shaft above the axis of the gear and having a member meshing with said gear, a bearing for said shaft and a deflector extending into proximity with said gear for conveying oil therefrom to said bearing.

4. In mechanism of the class described, the combination of a housing, a gear therein, a shaft above said gear and having a member meshing with said gear, a bearing for said shaft, and a member mounted on said shaft, and straddling said gear for conveying oil from the said gear to said bearing.

5. In mechanism of the class described, the combination of a housing, a gear therein, a shaft above said gear and having a member meshing with said gear, a bearing for said shaft, and a plate supported by said housing and extending into proximity with the periphery of said gear for deflecting oil therefrom to said bearing.

6. In mechanism of the class described, the combination of a housing, a gear therein, a shaft above said gear and having a member meshing with said gear, a bearing for said shaft, and a deflector straddling said shaft and gear for deflecting oil into said bearing.

7. In mechanism of the class described, the combination of a housing, a gear therein, a shaft above said gear and having a member meshing with said gear, a bearing for said shaft, and means for deflecting oil from said gear to said bearing comprising a plate having a wing portion extending circumferentially of said gear.

8. In mechanism of the class described, the combination of a housing, a gear therein, a shaft above said gear and having a member meshing with said gear, a bearing for said shaft, and means for deflecting oil from said gear to said bearing comprising a plate having a wing portion extending circumferentially of said gear, and a main portion extending at an acute angle radially of said gear.

9. In mechanism of the class described, the combination of a housing, a gear therein, a shaft above said gear and having a member meshing with said gear, a bearing on said shaft at each side of said member, and plates, each having a wing extending circumferentially of said gear for delivering oil to said bearing.

In testimony whereof I affix my signature.

CHARLES S. DAHLQUIST.